United States Patent [19]

Benschop

[11] 4,432,066

[45] Feb. 14, 1984

[54] MULTIPLIER FOR BINARY NUMBERS IN TWO'S-COMPLEMENT NOTATION

[75] Inventor: Nico F. Benschop, Eindhoven, Netherlands

[73] Assignee: U.S. Philips Corporation, New York, N.Y.

[21] Appl. No.: 282,887

[22] Filed: Jul. 13, 1981

Related U.S. Application Data

[63] Continuation of Ser. No. 71,801, Sep. 4, 1979, abandoned.

[30] Foreign Application Priority Data

Sep. 15, 1978 [NL] Netherlands ........................ 7809398

[51] Int. Cl.³ .............................................. G06F 7/52
[52] U.S. Cl. .................................................... 364/758
[58] Field of Search ......................................... 364/758

[56] References Cited

U.S. PATENT DOCUMENTS

| | | | |
|---|---|---|---|
| 3,469,086 | 9/1969 | Matthews, Jr. | 364/758 |
| 3,670,956 | 6/1972 | Calhoun | 364/758 |
| 3,752,971 | 8/1973 | Calhoun | 364/758 |
| 3,947,670 | 3/1976 | Irwin et al. | 364/758 |
| 4,130,878 | 12/1978 | Balph et al. | 364/758 |

*Primary Examiner*—David H. Malzahn
*Attorney, Agent, or Firm*—James J. Cannon, Jr.

[57] ABSTRACT

A device for multiplying two binary numbers in two's-complement notation having an array for forming bit-wise partial products and a further array for successively forming the result bits therefrom. The modules of the further array form either a full adder or a full subtractor under the control of a one-bit control signal. The negative sign of the most-significant bits of the factors can thus be taken into account. Devices of this kind can be linked in order to realize multiplications with higher precision, variation of the control signal signalling that only the device to which a most significant factor bit is applied takes into account a negative sign. A pipe line product-accumulator device is formed by construction in n-MOS dynamic logic circuits, with an inherent trigger function on the outputs of full adders/subtractors.

6 Claims, 21 Drawing Figures

| a | b | d | c | s | "n" |
|---|---|---|---|---|-----|
| 0 | 0 | 0 | 0 | 0 | 0 |
| 0 | 0 | 1 | 0 | 1 | 1 |
| 0 | 1 | 0 | 0 | 1 | 1 |
| 1 | 0 | 0 | 0 | 1 | 1 |
| 0 | 1 | 1 | 1 | 0 | 2 |
| 1 | 0 | 1 | 1 | 0 | 2 |
| 1 | 1 | 0 | 1 | 0 | 2 |
| 1 | 1 | 1 | 1 | 1 | 3 |
| +1 | +1 | +1 | +2 | +1 | |

I : [0,3]

| a | b | d | c | s | "n" |
|---|---|---|---|---|-----|
| 0 | 0 | 0 | 0 | 0 | 0 |
| 0 | 0 | 1 | 0 | 1 | -1 |
| 0 | 1 | 0 | 1 | 1 | 1 |
| 1 | 0 | 0 | 1 | 1 | 1 |
| 0 | 1 | 1 | 0 | 0 | 0 |
| 1 | 0 | 1 | 0 | 0 | 0 |
| 1 | 1 | 0 | 1 | 0 | 2 |
| 1 | 1 | 1 | 1 | 1 | 1 |
| +1 | +1 | -1 | +2 | -1 | |

I : [-1,2]

| a | b | d | c | s | "n" |
|---|---|---|---|---|-----|
| 0 | 0 | 0 | 0 | 0 | 0 |
| 0 | 0 | 1 | 0 | 1 | 1 |
| 0 | 1 | 0 | 1 | 1 | -1 |
| 1 | 0 | 0 | 1 | 1 | -1 |
| 0 | 1 | 1 | 0 | 0 | 0 |
| 1 | 0 | 1 | 0 | 0 | 0 |
| 1 | 1 | 0 | 1 | 0 | -2 |
| 1 | 1 | 1 | 1 | 1 | -1 |
| -1 | -1 | +1 | -2 | +1 | |

I : [-2,1]

| a | b | d | c | s | "n" |
|---|---|---|---|---|-----|
| 0 | 0 | 0 | 0 | 0 | 0 |
| 0 | 0 | 1 | 0 | 1 | -1 |
| 0 | 1 | 0 | 0 | 1 | -1 |
| 1 | 0 | 0 | 0 | 1 | -1 |
| 0 | 1 | 1 | 1 | 0 | -2 |
| 1 | 0 | 1 | 1 | 0 | -2 |
| 1 | 1 | 0 | 1 | 0 | -2 |
| 1 | 1 | 1 | 1 | 1 | -3 |
| -1 | -1 | -1 | -2 | -1 | |

I : [-3,0]

|     | h | g |                              |
|-----|---|---|------------------------------|
| M++ : | 0 | 0 | $c_0 = ab + bd + da$        |
| M+- : | 0 | 1 | $c_1 = (a+b+d)\bar{d} + abd$ |
| M-+ : | 1 | 0 | $c_2 = (a+b+d)\bar{b} + abd$ |
| M-- : | 1 | 1 | $c_3 = (a+b+d)\bar{a} + abd$ |

$s = (a+b+d)\bar{c}_0 + abd$
$c = \bar{h}\bar{g}c_0 + \bar{h}gc_1 + h\bar{g}c_2 + hgc_3$

MULTIPLIER FOR BINARY NUMBERS IN TWO'S-COMPLEMENT NOTATION

This is a continuation of application Ser. No. 071,801, filed Sept. 4, 1979 now abandoned.

FIELD OF THE INVENTION

The invention relates to a device for multiplying a first and a second binary number, said numbers comprising at the most q and p (p, $q \geq 2$) bit positions, respectively, said device comprising first means for forming at the most $p \times q$ bit-wise partial products of said two numbers, second means which comprise an array of $(p-1) \times q$ arithmetic modules, $(p-1)$ of which comprise at least two inputs, the other modules comprising three inputs, for forming an algebraic sum from two and three binary values, respectively, received, taking into account their sign, and for forming therefrom a two-bit number of result and carry, said modules being connected in accordance with bit-wise corresponding significance levels for receiving said partial products and corresponding bits of said results until for each significance level a single final result bit is generated on the outputs of $(p+q-2)$ modules and also an additional bit of highest significance on a special output of the most significant one of said $(p+q-2)$ modules and a bit of lowest significance on the output of lowest significance of said first means.

DESCRIPTION OF THE PRIOR ART

Multipliers of different types are described in the book "Theory and application of digital Signal processing" by L. R. Rabiner and B. Gold, Prentice Hall, 1975, notably on pages 514–524, particularly FIG. 8.35. Two's-complement notation is very customary for the addition of binary numbers, but less customary for multiplication. In the latter case preference is often given to the sign magnitude notation. One of the drawbacks of the known device consists in that said second means are composed of three types of modules which are denoted by I, II and V, respectively, each type having a different truth table. For the multiplication of two factors of p and q bit positions, respectively, the known device comprises $(p-2)(q-2)$ modules of type I, $(q-2)$ modules of type II and $(p+q-2)$ modules of the type V. Said book also describes modules of the other types III, IV which, however, are not used for said FIG. 8.35. In this respect, reference is already made to FIGS. 1a, 1b, 1c, 1d of the present Patent Application. The FIGS. 1a-1d show the four possibilities of addition or subtraction of two binary digits in a number in binary notation. There are three input quantities a, b, d, one of which indicates the input carry signal or input borrow signal from the bit position of next-lower significance. Furthermore, these three quantities are equivalent a priori, which means that they are of the same significance level, be it that they may have a different range of values. In the FIGS. 1a-1d such a choice is made that the quantities a and b always have the same range of values, whilst the quantity d in the FIGS. 1b-1c has a different range of values. There are two result bits c, s, s being equal to the input quantities, and c acting as an output carry signal or output borrow signal with respect to the bit position of next-higher significance. The latter (c), therefore, has a weight which is twice as high. n denotes the numerical value of the result in arithmetical representation. The first eight lines of digits indicate the eight possibilities for the quantities a, b, d. The ninth line of digits indicates the numerical value of the binary value of the relevant quantity which deviates from zero, thus this may be $\pm 1$, $\pm 2$. The other binary value of this quantity is then always zero. The tenth line of digits indicates the range of values of the final result. It will be clear that all columns under "s" are identical. It also appears that the columns under "c" in the FIGS. 1a and 1d are identical, which is also applicable in the FIGS. 1b and 1c with respect to each other. Furthermore, these columns for the two pairs are the same if $a = b$, but opposite for $a \neq b$ or $a \oplus b = 1$, $\oplus$ indicating the modulo-2 addition or EXCLUSIVE-OR function. Thus, it appears that all four combinations can be realized by means of only one full adder and one full subtractor as the arithmetic module.

SUMMARY OF THE INVENTION

The invention aims to provide a device in which on the basis of the truth table there are only two different module types and which, moreover, is suitable for the multiplication of numbers in two's-complement notation as well as in the sign-magnitude notation. The object of the invention is realized in that for the multiplication of two numbers in two's-complement notation said second means comprise a first group of one module for receiving, as a full subtractor, the most significant partial product of positive sign and two further bits of intermediate result of negative sign, a second group of one module for receiving, as a full adder, the two partial products of next-lower significance of negative sign and one bit of intermediate result of negative sign, a third group of $(q-3)$ modules for receiving, as full subtractors, one partial product which originates from the most-significant bit position of the second number and the relevant $(q-3)$ most significant but two bit positions of the first number of negative sign, a further partial product of positive sign which does not originate from the most-significant bit position of the first number, and one further bit of intermediate result of negative sign, a fourth group of one module for receiving, as at least a half subtractor, a partial product originating from the most-significant bit position of the second number and from the least-significant bit position of the first number of negative sign, and one further partial product of positive sign which does not originate from the most-significant bit position of the first number, a fifth group of $(p-2)$ modules, for receiving as a full subtractor, one partial product of negative sign which originates from the most-significant bit position of the first number and the relevant $(p-2)$ less-significant bit positions of the second number, and furthermore two bits of intermediate result of positive sign, a sixth group of $(p-2)$ modules for receiving as at least a half adder, two partial products of positive sign, a seventh group of $(p-2)$ $(q-3)$ modules for receiving as a full adder, a partial product of positive sign and two bits of intermediate result of positive sign, an eighth group of $(p-2)$ modules for receiving as a full adder, a result bit of negative sign annex a carry bit of positive sign, originating from said fourth group, and also the result bit of said second group of negative sign, and for serially presenting an output borrow bit within the eighth group and subsequently to the first group, and $(p-1)$ result bits parallelwise to the outputs of the eighth group, there being provided third means for supplying the least-significant module of the eighth group with the final result bit of next-lower significant level of negative sign, the full subtractors of first, third, fifth and eighth groups being constructed to form the same logic functions, all (half) subtractors comprising, in order to form the product of two numbers comprising exclusively bits of positive sign, a control input in order to be controlled as a (half) adder by a signal present thereon, said third means comprising a control input in order to be deactivated by a signal product thereon.

Thus, there are $[(p-2)(q-2)+1]$ full adders and $2p+q-5$ full subtractors. As a result of the limited number of different module types, a simplification is realized during design with discrete parts. The simplification is also applicable to an integrated circuit, because the number of elements in the "library" may be smaller. Obviously, when a negative number occurs in the formulas, for example, for $(q-1)$ where $q=2$, the value "0" must be read. The switching over to the multiplication of numbers comprising exclusively positive bits is easier, because the results of the (full) adder and (full) subtractor have so much in common. It will appear that modules having the same logic function may have a different geometry in an integrated circuit, but this is due to the limitations imposed by the substantially two-dimensional configuration of an integrated circuit. It will be clear that all full adders also have the same truth table and a corresponding logic construction, even though the correspondence need not extend as far as the gate level. An additional advantage of the described set-up is presented by the regular arrangement of the feeding of the input signals, so that the geometrical layout of an integrated circuit may be very systematic.

The known device also has the following drawback. During multiplication, the precision of the product, that is to say the number of significant bits thereof, in principle (neglecting rounding-off) equals the sum of the precisions of the factors. In principle, therefore, the precision of the operands must be extended accordingly for the multiplication. Extension of the precision in two's-complement notation can be readily realized by repetition of the information (0, Or 1) of the most significant bit as often as is necessary; however in that case only the very first bit is of negative sign. The extension of the operands in advance requires many components. Furthermore, multipliers are desirable for different operand lengths which consist of standard modules in accordance with the foregoing. For the multiplication of two numbers in two's-complement notation which comprise at the most ap and bq bits by means of $(a \times b)$ multipliers in accordance with the foregoing, said $(a \times b)$ multipliers preferably form a second array of successive significances according to:

$$\begin{cases} Ma,1 & Ma\text{-}1,1 & M2,1 & M1,1 \\ Ma,2 & Ma\text{-}1,2 & M2,2 & M1,2 \\ Ma,b\text{-}1 & Ma\text{-}1,b\text{-}1 & M2,b\text{-}1 & M1,b\text{-}1 \\ Ma,b & Ma\text{-}1,b & M2,b & M1,b \end{cases}$$

where the multiplier Ma,b has the highest significance and M1,1 has the lowest significance, the significances of Mi,j and Mk,l being the same if $i+j=k+l$, there being provided control inputs for changing, under the influence of a signal thereon, the operation of second, fifth and eighth groups of arithmetic modules of multipliers, Ma,1, ... Ma,b-1 with respect to the operation in the multiplier Ma,b during execution of a multiplication of two numbers in two's-complement notation, that is to say to convert (full) adders into (full) subtractors and vice versa, to change the operation of second, third and fourth groups of arithmetic modules of the multipliers Ma-1,b ... M1,b with respect to those of the module Ma,b in order to control all arithmetic modules of the remaining multipliers, except for the multiplier Ma,b, as (full) adders, and to deactivate in all further arithmetic modules in the same manner as in the multiplier Ma,b said third means of all multipliers except in Ma, b ... M1,b, there also being provided fourth means for forming a final product by algebraic addition of the final result bits of the multipliers, taking into account their significance level. In that case, there are at the most four different control modes (only two if either $a=1$ or $b=1$) in view of the fact that the bit position of highest significance level of both operands (also having the negative sign) must be independently processable. The fact that for the arithmetic modules only two truth tables are relevant which, moreover, have the parts for the result bit in common, facilitates the interfacing to the control signals.

For $a \geq 2$, said third means of the multipliers Ma,b ... M2,b preferably form each time a full subtractor of next-lower significance within said eighth group in order to receive, in addition to the final result bit of negative sign of the same significance from the same multiplier the most significant final result bit of negative sign from the multiplier of next-lower significance within the row Ma,b ... M2,b with the exclusion of supply to said fourth means, and also the most significant final result bit but one of positive sign. This results in a simplification of said fourth means.

Furthermore, the arithmetic modules are preferably constructed as integrated circuits in dynamic MOS logic with an inherent latch (hold) function on the outputs for result bit and carry, the outputs for the final result bits being connected to corresponding inputs of a further group of series-connected modules, having a logic construction which corresponds to that of said $q(p-1)$ modules, which form an accumulator register by way of their full adder function. Thus, a very attractive accumulator is created for a product series of two's-complement numbers, for example, for calculating internal products of multi-dimensional vectors. Such and other products are commonly used in the technique, the pipe line effect of the device in accordance with the invention enabling a high processing speed without it being necessary for the modules themselves to be extremely fast.

BRIEF DESCRIPTION OF THE DRAWINGS

The invention will be described in detail hereinafter with reference to some Figures.

DESCRIPTION OF THE PREFERRED EMBODIMENT

Figure 2A:
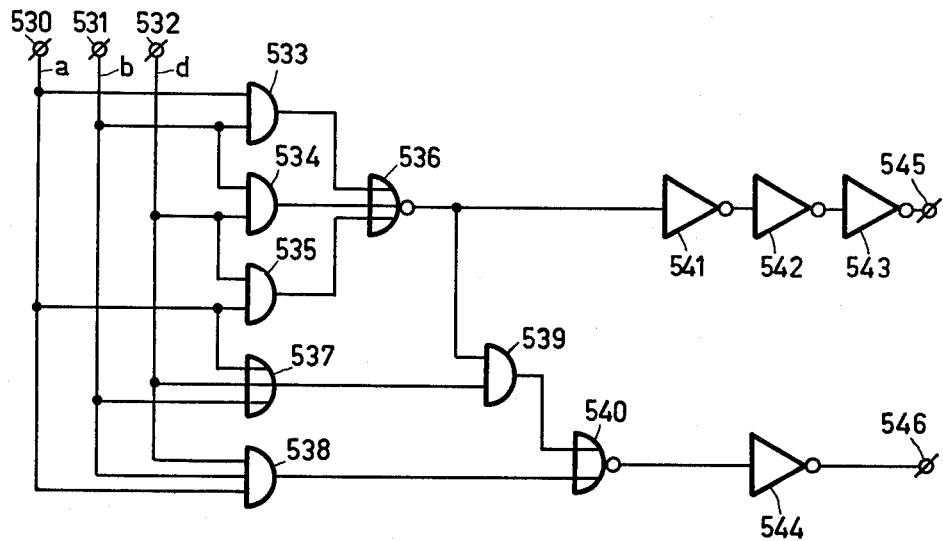
FIG. 2a shows a simplified diagram of a full adder.

FIG. 2a shows a simple diagram of a full adder. Input 530 receives a signal a, input 531 receives a signal b and input 532 receives a signal d. AND-gates 533–535 form the combinations a.b, b.d, d.a.NOR-gate 536 forms $\overline{a.b + b.d + d.a}$ therefrom. This is presented on an output 545 as a carry signal c by a series connection of three inverters. The three inverters are required in view of the specific properties of the realization in n-MOS dynamic logic to be described hereinafter. OR-gate 537 forms the signal a+b+d, so that AND-gate 539 supplies a logic "1" only if one, and not more than one, of the input signals is "1". AND-gate 538 forms a.b.d; NOR-gate 540, in series with inverter 544, presents the signal s on output 546 which has the value 1 when an odd number of input bits has the value 1.

Figures 1A, 1B, 1C, 1D, 5:
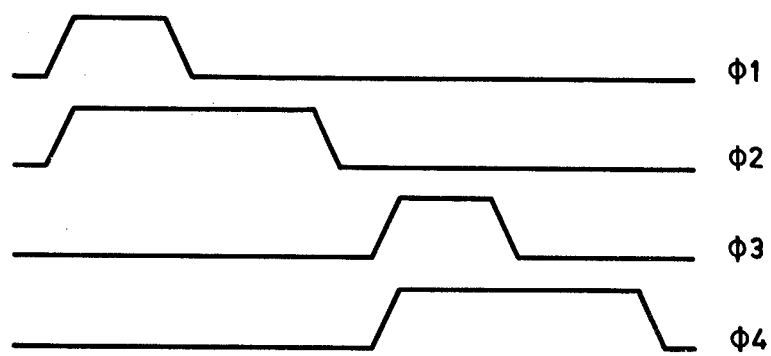
FIGS. 1a, 1b, 1c, 1d show the four possibilities of addition and subtraction of a number of binary notation.
FIG. 5 shows a clock pulse diagram.
Figure 2B:
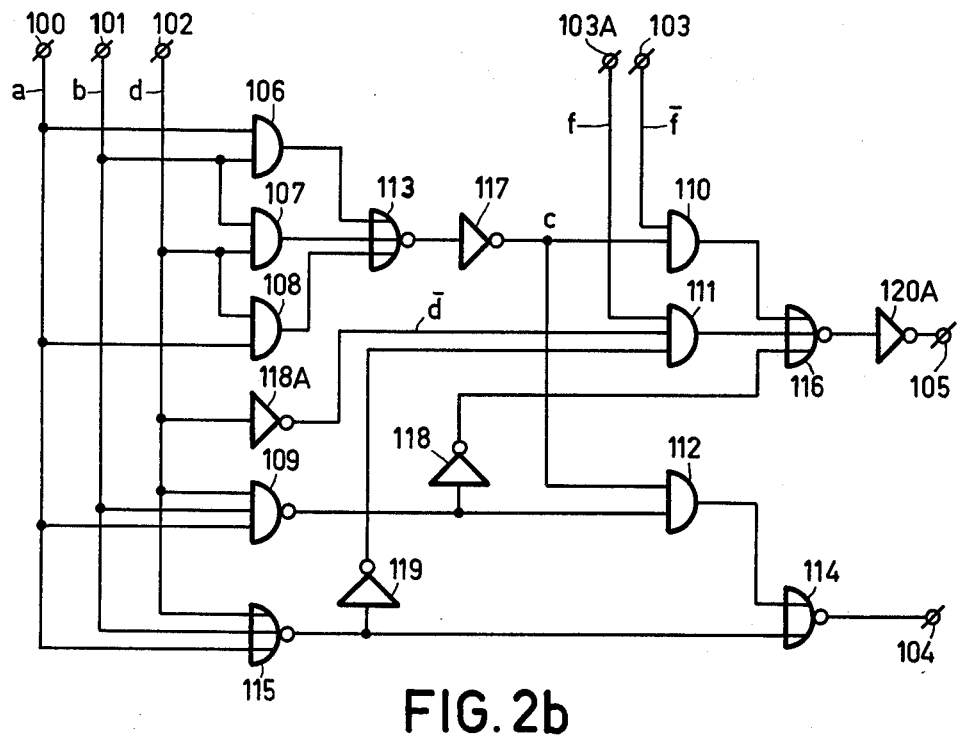
FIG. 2b shows a simplified diagram of a programmable full adder subtractor.

FIG. 2b shows a simple diagram of a programmable full adder/subtractor, for use in a device in accordance with the invention. The device comprises three data inputs 100, 101, 102 for the binary bits a, b, d, as defined with reference to the FIGS. 1a–1d. Furthermore, there are provided two control inputs 103, 103A for the function control signal $\overline{f}$ and the inverted value f thereof, a result output 104 for the signal s and a carry/borrow signal output 105 for the signal c. The circuit furthermore comprises six AND-gates 106, 107, 108, 110, 111, 112, a NAND-gate 109, four NOR-gates 113–116, and five inverters 117, 118, 118A, 119, 120A. The logic diagram is specifically drafted for realization, to be discussed hereinafter, in n-MOS dynamic logic with multiple use of different logic terms. The alternatively present signals f, $\overline{f}$ unblock only one of the two AND-gates 110, 111. The realization takes place in accordance with the following formulas, in which a dot indicates a logic AND-function and a plus sign indicates a logic OR-function:

Full adder: c = (a.b)+(b.d)+(d.a) (f=0)

s = (a+b+d).c̄ + (a.b.d)

Full subtractor: c' = (a+b+d).d̄ + (a.b.d) (f=1)

Switching over: $c_f = (c.\overline{f}) + (c'.f)$ Therein, a stroke over a variable indicates the inverted value and c' is the borrow output signal. The gate 106 forms the signal a.b, the gate 107 forms the signal b.d, the gate 108 forms the signal d.a the gate 113 forms the signal ab+bc+da, so that the element 117 forms the signal c. The gate 115 forms the signal $\overline{a+b+d}$ and the gate 111 forms the signal $f.\overline{d}.(a+b+d)$. The elements 109, 118 form the signal a.b.d. The elements 116, 120A then form the signal $$a.b.d + f.\overline{d}.(a+b+d) + \overline{f}.(a.b + b.d + d.a)$$

Several terms thereof are redundant: if the third term has the value 1, the first term is redundant and the second term can be abbreviated as:

$f.\overline{d}.(a+b)$

The use of these redundant terms, however, does not require additional components, so that it is not detrimental: actually, the electronic set-up is simplified thereby. The element 112 forms the signal c.$\overline{(a.b.d)}$. The gate 114 forms the signal:

$$\overline{\overline{a+b+d} + c.\overline{(a.b.d)}} = (a+b+d).(\overline{c} + a.b.d) = \overline{c}(a+b+d) + a.b.d$$

In the latter expression, the redundant part has been omitted again.

Figure 3:
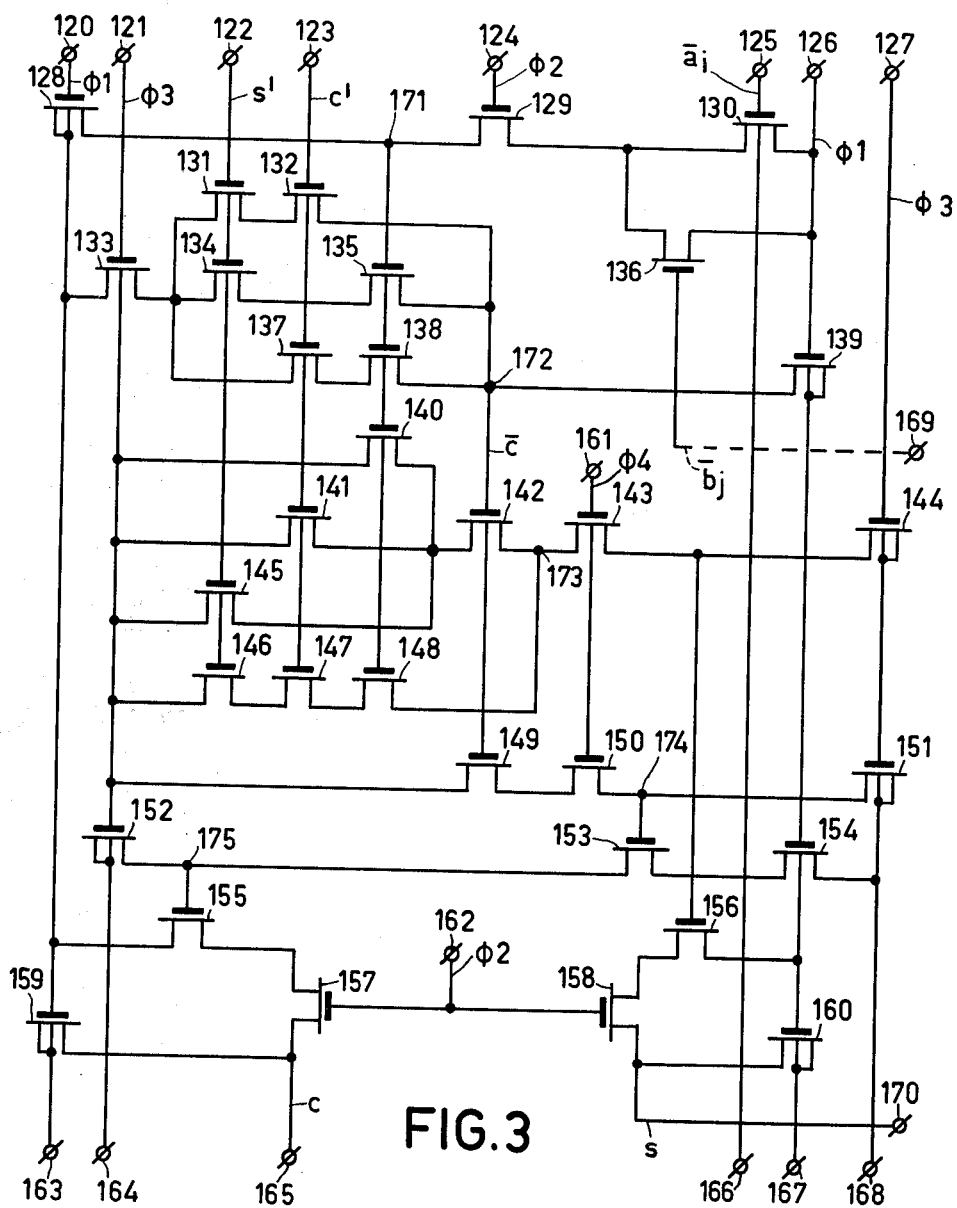
FIG. 3 shows a full adder in n-MOS technology.

FIG. 3 shows a full adder in n-MOS technology, including a partial product former also being provided. The circuit operates in accordance with dynamic logic principles, and in this respect FIG. 5 shows a clock pulse diagram with four phases and four signals $\phi 1$, $\phi 2$, $\phi 3$, $\phi 4$ which are generated by a clock pulse generator which is not shown for the sake of brevity. Four-phase logic is well-known in the technique of n-MOS applications. Its principle is based on the fact that the information is formed by the charge on a node capacitance. The capacitance of a first type of logic gate is always charged by the positive-going edge of $\phi 1$; this is the precharge phase. After the clock pulse $\phi 1$ has become low, the actual logic function is implemented in the sample phase for as long as $\phi 2$ is still high. During the remainder of the cycle ($\phi 3$ and/or $\phi 4$ high) the information is available for further processing. After $\phi 4$ has become low again, the next clock pulse cycle commences. The different types of gates are described in an article by S.P.Asija, Four phase logic is practical, Electronic Design, Dec. 20, 1977, pages 160-163. Furthermore, for each clock pulse cycle two successive levels of logic function formation are customarily realized: for the second level, the operation of the pairs of clock pulse phases $\phi 1/\phi 2$ is interchanged with respect to $\phi 3/\phi 4$.

FIG. 3 shows a realization of the full adder of FIG. 2a as an integrated circuit. The clock pulse $\phi 1$ therein is received on the polysilicon lines 120/163, and 126/167, the clock pulse $\phi 3$ is received on the polysilicon lines 121/164 and 127/168, the inverted value of an input bit $\overline{a}_j$ is received on the through polysilicon lines 125/166, an input carry signal c' is received from the arithmetic module situated at a next-higher level on the terminal 123 wherefrom a polysilicon line departs, an input result signal s' is received on terminal 122 wherefrom a polysilicon line also departs. Said polysilicon line and also further lines of polysilicon which extend parallel thereto, form a first layer of wiring. On a terminal 169 a second input bit $\overline{b}_j$ can be received; the interrupted line shown extends across the Figure and is made of aluminium. The bit conductors thus extend transversely across the arithmetic modules, with the result that the bit signals are readily available in all locations. Terminals 124, 162 can receive the clock pulse $\phi 2$, each time along such a transversely extending aluminium conductor. The terminal 161 can receive the clock pulse $\phi 4$ along such an aluminium conductor. Said aluminium conductors together constitute a second layer of wiring.

On the terminal 165 the output signal c appears, while on the output 170 the output signal s appears for processing in adjoining modules. The Figure furthermore shows a large number of horizontally extending, uninterrupted connection lines with which vertically extending intermediate connection lines are associated at various locations, for example, the connection between point 173 and the transistor 148. These are constructed as n+ diffusion zones and together form a third layer of wiring. At areas where an n+ zone and a polysilicon conductor cross each other, a transistor is formed if no further steps are taken. If this crossing must be contactless, which is locally indicated by a through line, a so-called under passage is present which is known from the "LOCOS" technology, the n+ being locally constructed as a recessed. Arsenic, n+ implanted layer over which the crossing polysilicon line is provided. The intermediate zone forms a separation where no high load capacitance is formed. Full three-layer wiring is thus possible. Connections between the layers of conductors are denoted by a cross.

The circuit furthermore comprises 33 transistors 128–160. Under the control of the clock pulse $\phi 1$ (coincident with $\phi 2$), the node 171 is charged. Unless $\bar{a}_i$ and $\bar{b}_j$ are both zero, this node becomes equal to zero again after the sampling phase ($\phi 1$ low again). Thus, the information ai.bj is present on the node 171. Via the transistor 139, the node 172 is also precharged during the phase $\phi 1$. In this circuit, the signals s' (terminal 122), c' (terminal 123) and $a_i$.b (node 171) act as the relevant signals a, b and d in FIG. 2a.

Transistors 131, 132 form the analogon of the gate 533 in FIG. 2a; transistors 134, 145 correspond to gate 535, and transistors 137, 138 correspond to gate 534. Under the control of the clock pulse $\phi 3$, the node 172 is discharged if an output carry signal is to be generated and also to block the transistor 142. Thus, the NOR-function of the gate 536 is implemented on the node 172. Via transistors 143, 144, the node 173 is precharged by the clock pulse $\phi 3$. During the clock pulse $\phi 4$, this node is discharged if at least one of the connections 122, 123, 171 is high via transistors 140, 141, 143 which form an OR-function for this purpose. However, if the node 172 is discharged, the transistor 142 remains blocked. The node 173 is also discharged if all three input quantities have the value 1 via the transistors 146, 147, 148 which form an AND-function for this purpose. The NOR-function of the gate 540 is thus implemented on the node 173.

Via the transistor 151, the clock pulse $\phi 3$ also ensures that the node 174 becomes high, said node being subsequently discharged (sampling) if the node 172 is not discharged and the transistor 149 remains conductive. The inverter 541 is thus implemented on the node 174. Via transistor 152 the clock pulse $\phi 1$ also acts to precharge the node 175. This node is discharged by the subsequent clock pulse $\phi 1$ (i.e. the second one), provided that the node 174 is high. The inverter 542 is thus implemented on the node 175. The subsequent clock pulse $\phi 2$ (i.e. the second one) on the terminal 162 renders the transistor 157 conductive. Just before that, the clock pulse $\phi 1$ finished precharging the node of the terminal 165 via the transistor 159. Therefore, if the node 175 was high, the node of the terminal 165 is discharged via transistors 155 and 157. On the terminal 165 the inverter 543 is thus implemented and the signal c is available for processing on the terminal 123 of a subsequent arithmetic module. The transistors 143, 156, 158, 160 correspond to the transistors 150, 155, 157, 159 so that the signal s is subject to the same electronic circumstances, except for the fact that two inversions are omitted, and appears on the terminal 170 for further processing. It is to be noted that the module shown in FIG. 3 internally has a pipe line function to some extent, where signals of two successive processing operations are represented in different parts of the module.

Figure 4:
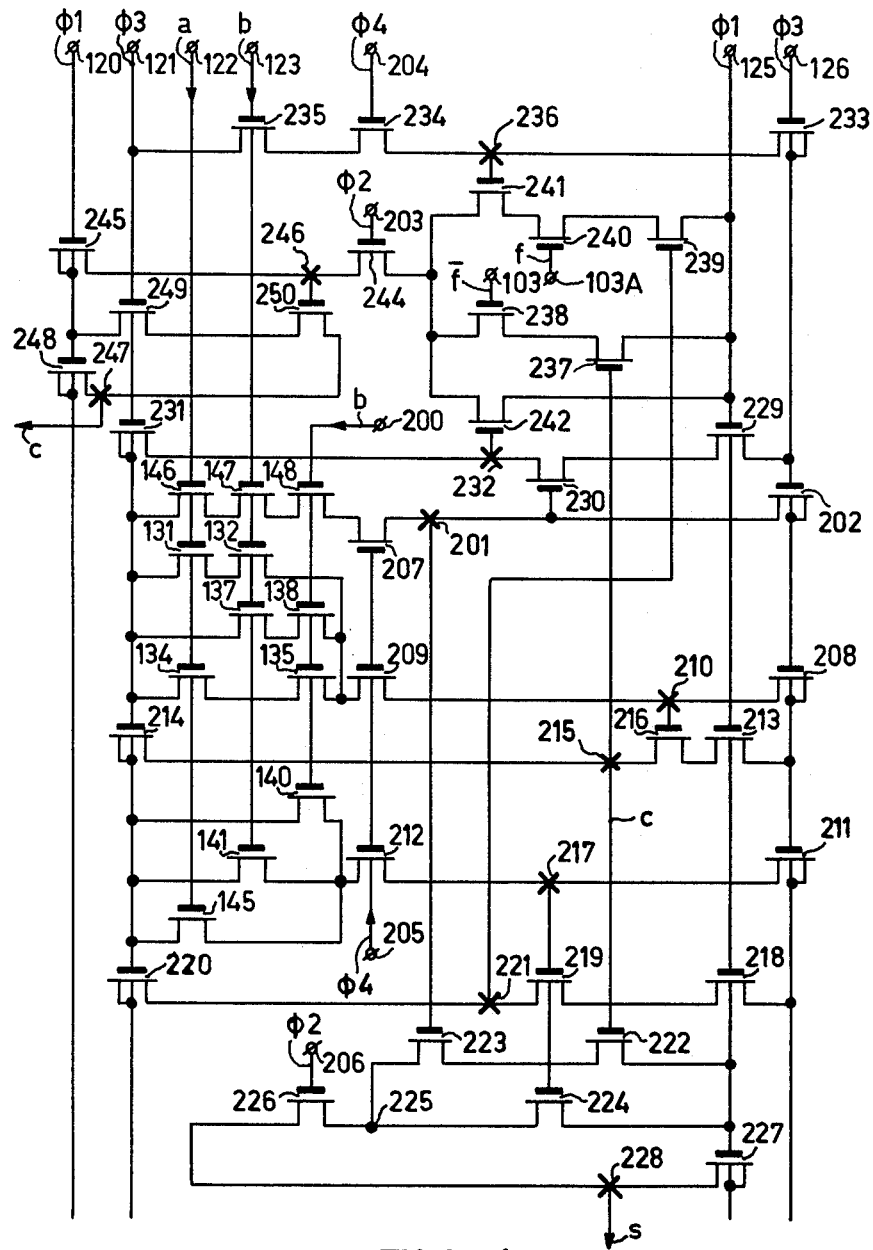
FIG. 4 shows a programmable full adder/subtractor in n-MOS technology.

FIG. 4 shows a programmable full adder/full subtractor in n-MOS technology according to FIG. 2b. The circuit partly corresponds to that of FIG. 3 and corresponding elements are denoted by corresponding references. Connections 120/125 receive the clock pulse $\phi 1$, and connections 121/126 receive the clock pulse $\phi 3$. In this case, the third input quantity b is received on an input 200 (in a full adder, the input signals are interchangeable); the clock pulse $\phi 2$ is received on inputs 203, 206, and the clock pulse $\phi 4$ is received on inputs 204, 205. Node 201 is precharged via transistor 202 ($\phi 3$), sampling being effected by transistor 207 ($\phi 4$). Transistors 146, 147, 148 form the function $\overline{a.b.d}$ (gate 109 in FIG. 2b) at this point. Node 210 is precharged via transistor 208 ($\phi 3$), sampling being effected via transistor 209 ($\phi 4$). Transistors 131, 132, 137, 138, 134, 135 form the function $\overline{a.b+b.d+d.a}$ (gate 113 in FIG. 2b) at this point. Node 215 is precharged via transistor 214 ($\phi 3$) and is sampled by the series connection of transistor 213 ($\phi 1$) and transistor 216 which can be made conductive by the voltage on node 210. The inverter 117 of FIG. 2b is thus implemented. Node 217 is precharged via transistor 211 ($\phi 3$) and sampled via transistor 212 ($\phi 4$), so that the function $\overline{a+b+d}$ (gate 115 of FIG. 2b) is implemented on the node 217. The transistors 218, 219, 220 invert this signal in the same manner as described for the transistors 213, 216, 214, so that the inverter 119 of FIG. 2b is implemented on the node 221. Node 201 controls the transistors 223, node 215 controls the transistor 222, and node 217 controls the transistor 224. The precharging of the node 228 is realized via transistor 227 ($\phi 1$), sampling being effected by means of a transistor 226 which is connected in series with two parallel-connected branches. The first branch comprises transistors 223 and 222 connected in series, the gate 112 of FIG. 2b thus being implemented. The second branch comprises a transistor 224 which is driven by the node 217. The output of the gate 114 of FIG. 2b is thus implemented on the node 228; therefore, this is the signal s.

Figure 6:
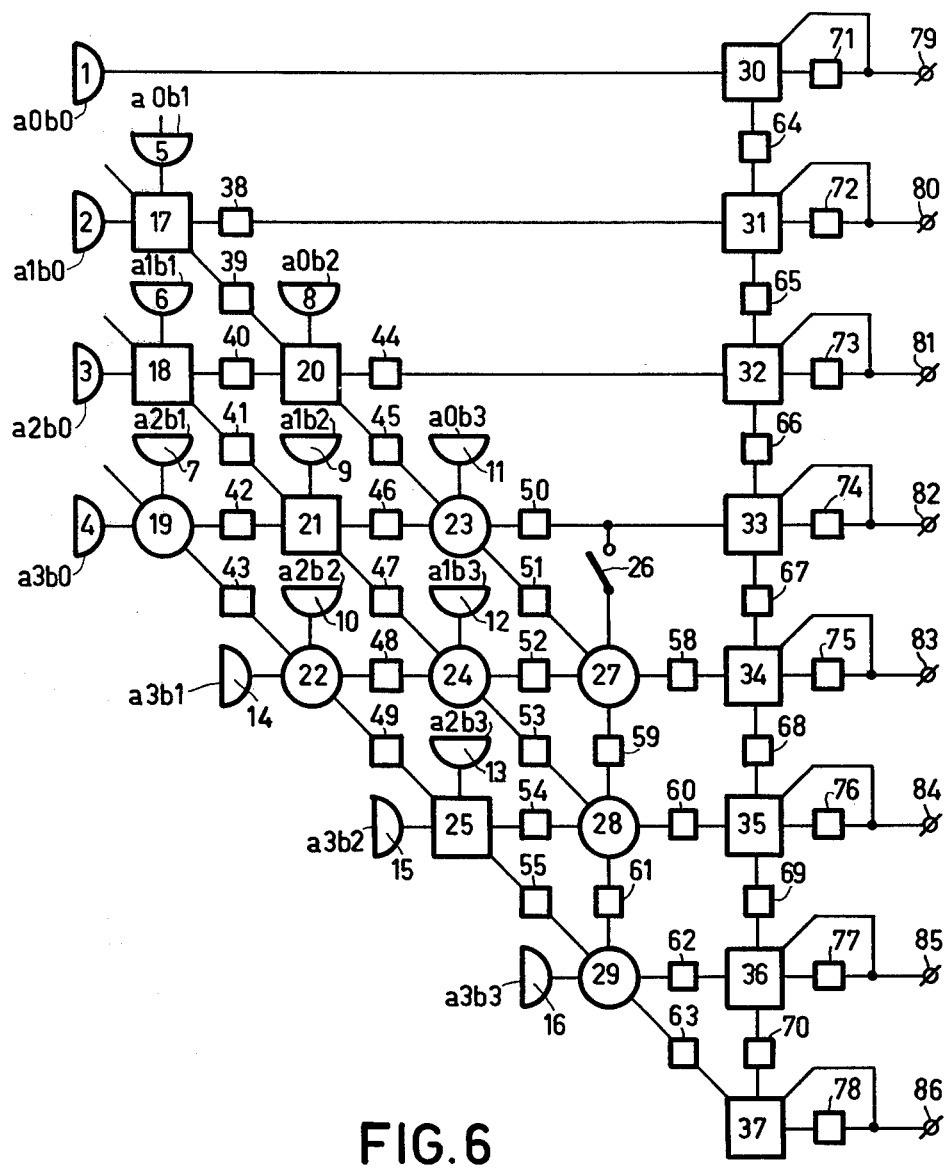
FIG. 6 shows a multiplier.

The transistors 229, 230, 231 form an inverter similarly to the transistors 213, 216, 214, so that the inverter 118 of FIG. 2b is implemented on the node 232. The transistors 233, 234, 235 again form an inverter for the signal d on the input 123, so that the inverter 118A of FIG. 2b is implemented on the node 236. The inputs 103A, 103 again receive the control signals f and $\bar{f}$, respectively. As a result of the series connection of transistors 237 and 238 (the former receives the signal c from the node 215), the AND-function of the gate 110 in FIG. 2b is implemented. By series connection of transistors 239 (which receives the signal from the node 221) 240 (which receives the signal f on the terminal 103A) and 241 (which is controlled by the signal from the node 236), the AND-function of the fate 111 in FIG. 2b is implemented. The latter two series connections constitute, together with transistor 242, three parallel-connected branches. The node 246 is precharged via transistor 245 ($\phi 1$) and sampled via the series connection of transistor 244 ($\phi 2$) and said three parallel-connected branches, the gate 116 of FIG. 2 thus being implemented. Node 247 is precharged via transistor 248 ($\phi 1$) and sampled via the series connection of transistor 249 (clock pulse $\phi 3$) and transistor 250 which is controlled by the voltage on the node 246, so that the inverter 120A of FIG. 2 is implemented to form the output carry/borrow signal. Thus, for example, the arithmetic module 127 of FIG. 6 is implemented whose function in the arrangement of arithmetic modules will be described in detail hereinafter. It is to be noted that the circuit shown in FIG. 4 in integrated form has the same pitch in the width direction as that shown in FIG. 3, but a larger height. It will also be clear that the arrangement of the transistors or nodes can be modified without modification of the logic function.

FIG. 6 shows, by way of example, a multiplier for two binary numbers, each of which comprises four bits in two's-complement notation, reference being made to FIG. 8.35 of said book by Rabiner and Gold for the purpose of comparison. The Figure only shows the logic function elements, the further implementation and control by, for example, clock pulses not being described. Important differences with respect to the known device consist in the fact that, as a result of the technology used, hold functions are present on the outputs of the arithmetic modules; in conjunction with the added accumulator, this enables a pipe line function, so that a much higher speed can be achieved, the modules being sub-divided into only two categories with different logic functions among the categories, and various additional possibilities of use being created by the use of switchable (full) adders/subtractors. The device comprises sixteen logic AND-gates (1–16), twenty arithmetic modules (17–25, 27–37), forty-one latch circuits which act as hold elements (38–55, 55–78), one switch 26 and eight data outputs 78–86. The two input quantities are written as the bit rows (a3a2a1a0) and (b3b2b1b0) the most significant bits a3 and b3 respectively, having a negative value. The large squares in the Figure denote arithmetic modules which comprise three inputs and which act as full adders. The circles denote arithmetic modules comprising three inputs which act as full subtractors. The modules 19, 22–25, 27–29 may be programmable to be operational in one of two modes as will be described hereinafter, but the relevant control is omitted in this Figure for the sake of simplicity. Each of the AND-gates 1–16 receives a specific combination of the bits of the two input quantities, thus forming a partial product which itself is also a bivalent quantity. The AND-gate 1 forms the partial product a0b0 which can be applied to the module 30. The AND-gate 2 forms the partial product a1b0. The AND-gate 5 forms the partial product a0b1. The latter two partial products are added in the module 17 which may have two different constructions. The first construction is like an already described full adder; in that case, a third input indicated receives a void signal which acts as a logic "0". The second construction consists in that this module operates as a known half-adder, the sum signal being formed by the EXCLUSIVE-OR-function, the carry output signal being formed by the logic AND-function of the input signals. The module 17 can thus be referred to as being "at least a half-adder". The result bits, however, are derived from the input data in the same logic manner. The AND-gate 3 forms the function a2b0 and the AND-gate 6 forms the function a1b1, said functions being added in the module 18. The module 18 may have the same construction as the module 17. The AND-gate 7 forms the function a2b1 and the AND-gate 4 forms the function a3b0; the latter gate has, due to the properties of the two's-complement notation, a negative sign, so that the module 19 acts as a subtractor. This can again be realized in two ways; first of all, in that the module 19 operates as a known full subtractor. The third, free input then receives a void signal which acts as a logic zero. On the other hand, this module can also act as a "half-subtractor": when the two input signals are equal, all output signals are zero; when they are not equal, the result signal is always 1 and the borrow output signal is equal to the signal of the gate a3b0. The numerical value of the result lies in the range [−1, +1], and such a choice is made that the result bit has a positive sign, while the borrow output bit has a negative sign. The module 19 can thus be referred to as being "at least a half-subtractor". The result bits of the modules 17–19 are applied to the hold circuits 38, 40, 42, and the output carry bits (or the output borrow bit from the module 19) are applied to the hold circuits 39, 41, 43. In the modules 17–19, the arithmetic operation takes place within one clock cycle. At the end of the cycle, the data formed are stored in the hold circuits. The AND-gate 8 forms the partial product a0b2, the AND-gate 9 forms the partial product a1b2, the AND-gate 10 forms the partial product a2b2, and the AND-gate 14 forms the partial product a3b1, the latter partial product having a negative sign. Furthermore, the arithmetic module 20 receives the output signals of the hold circuits 39 and 40; the arithmetic module 21 receives the output signals of the hold circuit 41 and 42, and the arithmetic module 22 receives the output signal of the hold circuit 43. The latter signal has a negative sign due to the (full) subtraction in the module 19. The data of the hold circuit 38 is applied to the accumulator register to be described hereinafter. During the next clock pulse cycles, the modules 20, 21 act as a full adder and the module 22 acts as a full subtractor, the results thus formed being stored in the hold circuits 44–49 in the same way as described with reference to the modules 17–19.

The AND-gate 11 forms the partial product a0b3 and the AND-gate 12 forms the partial product a1b3, both partial products having a negative sign. The modules 23 and 24, moreover, receive the data from the hold circuits 45–48 (all data having a positive sign), so that these two modules act as full subtractors. The AND-gate 13 forms the partial product a2b3 and the AND-gate 15 forms the partial product a3b2, both partial products having a negative sign, like the borrow output signal from the hold circuit 49, so that the module 25 acts as a full adder, be it for data which all have a negative sign. The results of these operations are again stored in the relevant hold circuits 50–55 in the same was as described for the hold circuits 44–49. The AND-gate 16 forms the partial product a3b3 which has a positive sign due to the negative signs of both factors thereof. For the multiplication of two numbers in two's-complement notation, the switch 26 (which may be an input transistor of the module 26 or a discrete component) is closed. The output signal of the module 23 has a numerical value in the range [2, −1]. Therefore, the result bit of the module 23 has a positive sign for processing in the accumulator to be described hereinafter, but a negative sign for processing in the module 27. The module 27 thus receives a bit having a positive sign from the hold circuit 51, and a bit having a negative sign from the hold circuit 52. The module 50 again acts as a full subtractor and delivers a result having a numerical value in the range [+1, −2]. The bit of the hold circuit 50 is applied in order to obtain proper correction, so that the product in two's-complement notation obtains the correct value. The result bit of the module 27 is applied to the hold circuit 56, the output carry/borrow bit being applied to the hold circuit 59. The operation of the modules 28 and 29 is similar to that of the module 27, so that the positive final result bits always appear in the hold circuits 38, 44, 50, 58, 60, 62, the output borrow bit of negative sign from the module 29 appearing in the hold circuit 63, and the partial product of lowest significance appearing on the output of the gate 1. These eight product bits are each time applied to the corresponding full adder module of the series 30–37. The result bits are applied to the hold circuits 71–78, and the output carry bits are applied to the hold circuits 64–70, the output of which is each time connected to an input of the module of next-higher significance. The accumulated final result appears on the corresponding outputs 79–86 for further processing. When a product is to be determined and one clock-pulse cycle suffices for each arithmetic module for an elementary operation, at the most eight clock pulse cycles will expire before the complete product is known and the propagation of all carry and borrow output signals has been completed (for example, in the series of modules 17-20-23-27-34-35-36-37). On the other hand, the duration of the formation of the partial products and the processing thereof in the modules of the first line (i.e. the numbers 17–25, 29, 30) amounts to only one clock pulse cycle, after which these modules become available again for receiving two subsequent numbers to be multiplied. Thus, during each clock pulse a product can be formed when the products are accumulated anyway. The latter is the case, for example, during determination of the internal product of two vectors: (a3 . . . a0) then constitutes a given component of such a vector. The circuit shown in FIG. 6 can be extended by means of an additional arithmetic module instead of the switch 26. This module acts as a full subtractor and receives the signal from hold circuit 50. The result bit is applied, again with a positive sign, to the module 33, the borrow output bit of negative sign being applied to the module 27. The delay time of the signals, however, is one clock pulse longer: after the last components of a series of pairs of factors has been applied, $p+q+1$ (in this case nine) clock pulse periods will yet expire before the result is known. If the hold circuits are absent, the presentation of new data must be postponed until the entire circuit has returned to its rest condition. Obviously, for the same processing speed inside the modules, this procedure will be much slower than required according to the set-up of FIG. 6.

Each of the arithmetic modules may be a separate component, but they may also be integrated together. In the foregoing (four-phase) dynamic MOS logic is mentioned as an attractive embodiment, in which notably the output nodes of the gates act as hold elements so that no additional substrate area is required thereby. The circuit shown in FIG. 3 can be used in FIG. 6 in order to realize the modules 20, 21 and also the modules of the accumulator register 30–37, the formation of the partial product being omitted in the latter and the result bit output being fed back to the input. The module 25 requires the formation of two partial products. The circuit shown in FIG. 4 can be used for the modules 27, 28 and, with addition of an additional AND-gate, for the module 29. Module 29 is shown in a different form in FIG. 12. The modifications of the other modules with respect to the module explicitly shown consist in either the omission of given elements (such as the half-adders with respect to the full adders), or the changed sign of the input signal arriving from a given direction, so that the wiring pattern of an input signal must be modified.

The further set-up of the circuit shown in FIG. 6 and the use thereof for multiple precision of the operands will yet be described in detail.

Figure 7:
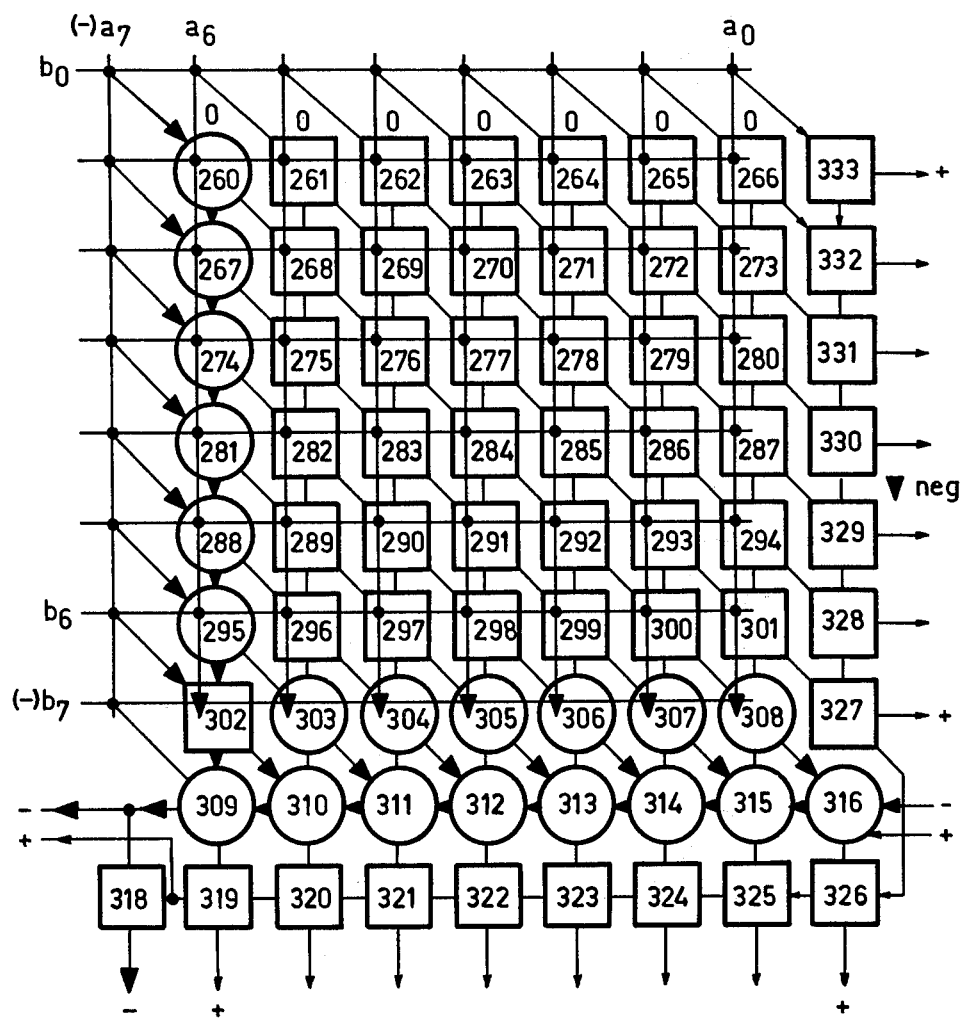
FIG. 7 shows an extension of the circuit shown in FIG. 6.

FIG. 7 shows an extension of the circuit shown in FIG. 6, i.e. for two operands comprising eight bits each, for which 73 arithmetic modules are required. The eight-bit operands are input from the left (b7 . . . b0) and from the top (a7 . . . a0), a7 and b7 having a negative sign. The most significant bit from a module (carry/borrow) is output downwards, the least-significant bit being output downwards to the right. The formation of a product bit is indicated by a dot. The module 260 may be a half subtractor and the modules 261–266 may be half adders, symbolized by an input signal "0". The modules 267, 274, 281, 288, 295, 303–316 are full subtractors, the other modules being full adders. The module 316 takes the place of the switch 26 of FIG. 6. The device may be proportioned for operands of arbitrary length. It is alternatively possible to construct the device from a number of subdevices, each of which forms a part of the product. To this end, each of the two operands may be split, for example, into a more-significant part and a less-significant part, both parts comprising four bits. The most significant bits of the less-significant parts of the operands then have a positive sign. Separate multipliers can then be constructed for the four combinations. FIGS. 8a–d show the functions to be performed in the relevant devices; the construction involving programmable arithmetic modules will be described in detail at a later stage. The circuit shown in FIG. 8c corresponds to FIG. 6 and receives a most-significant part of both operands; the modules 288–290, 295–297, 302–304 and 309–311 in FIG. 7 are thus represented (the accumulator register is omitted). The modules 281–283 are absent, because the modules 343, 344 can now receive two partial products (cf. modules 17, 18 in FIG. 6), while the least-significant partial product need not be applied to a module (cf. AND-gate 1 in FIG. 6). Also added is the module 345 at the position of the switch 26 in FIG. 6 in order to ensure that the input signal to the module situated to the left thereof has the correct value. A minus/plus sign on an input of a module indicates the sign of an input bit thereto; the sign $(-/+)$ in a module indicates the sign of an input bit not denoted by an arrow. Squares again denote adders and circles denote subtractors. A thickened arrow denotes an input quantity having a negative sign. The circuit shown in FIG. 8a receives the most-significant part of the first operand (a) and the least-significant part of the second operand (b). This circuit represents the modules 260–262, 267–269, 274–276 is FIG. 7. Also added are the modules 340–342 which correspond to the modules 27, 28, 29 in FIG. 6. The modules 341, 342, 346, 347 are now full adders, because it is not necessary to process a negative sign with respect to the second operand. For the same reasons, the module 348 is now a full subtractor which receives only one partial product of negative sign. In this case, the switch 26 (FIG. 6) may be driven so that it is open. On the other hand, instead of the full subtractor 345 of FIG. 8c, a module acting as a full adder can be implemented in this location. Because it receives only one input bit, there will never be a carry signal to the module 342. The circuit of FIG. 8d receives the least-significant part of the first operand (a) and the most-significant part of the second operand. This circuit represents the modules 292–294, 299–301, 306–308, 313–315 in FIG. 7, the modules 350, 351 being full adders in this case and the module 349 being a full subtractor, because it is not necessary to process a negative sign with respect to the first operand. However, these is provided a module which corresponds to the module 345 in FIG. 8c (and hence to the module 316 in FIG. 7) and which acts as a full subtractor, or otherwise a switch as shown in FIG. 6 (element 26) which is now closed. There are no modules which correspond to the modules 285-287, because each of the modules 351A, 351B can receive two partial products, the partial product of lowest significance being directly accumulated. The circuit shown in FIG. 8b receives the least-significant parts of both operands and consists completely of (full) adders, because now exclusively positive signs have to be processed. This circuit represents the modules 264-266, 271-273, 278-280 in FIG. 7, an additional row of full adders, corresponding to the modules 27-29 in FIG. 6, again being added. The switch 26 is again controlled to the open position. The circuit shown in FIG. 8b per se is suitable for multiplication of two four-bit numbers in the notation according to sign and magnitude. Thus, if all (full) subtractors in FIG. 6 are switchable to form (full) adders, a multiplier is formed for two kinds of numbers. The double use, of course, is very attractive.

Each of the circuits 8a-d supplies an eight-bit partial final result. The significance level of one bit corresponds to the modules 318-321 and 330-333 of FIG. 7, while that of three bits corresponds to the modules 322-329. These bits are summed (in a manner not separately shown), for example, in two successive arithmetic steps: during a first arithmetic step, said three bits are reduced to two bits; during a second step, all bits are added to form a single product: 9+12=21 adding operations are then sufficient (no addition is required for the four least-significant bits). Therebehind there may be connected another accumulator register (modules 318-333) for updating the running sum of successively formed products. During the formation of the products, obviously, the negative sign of the most-significant bits from the circuits shown in the FIGS. 8b, d must be taken into account. Similarly, a set-up of (mxn) partial multipliers is possible.

Figure 8A:
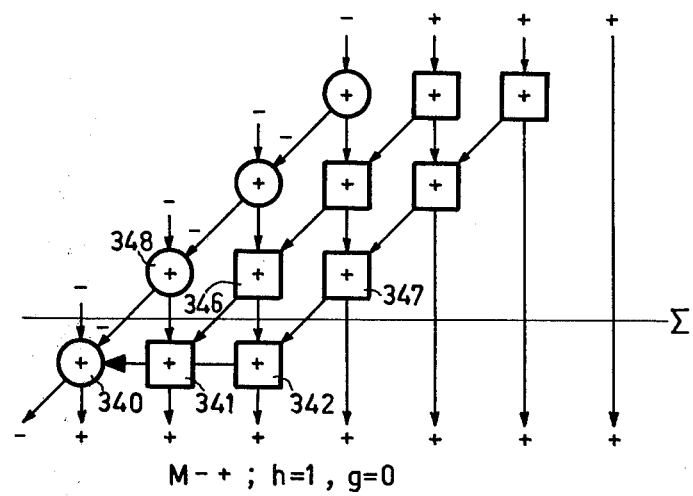
FIGS. 8a through 8d show subcircuits obtained by subdivision of the circuit shown in FIG. 7.
Figure 8B:
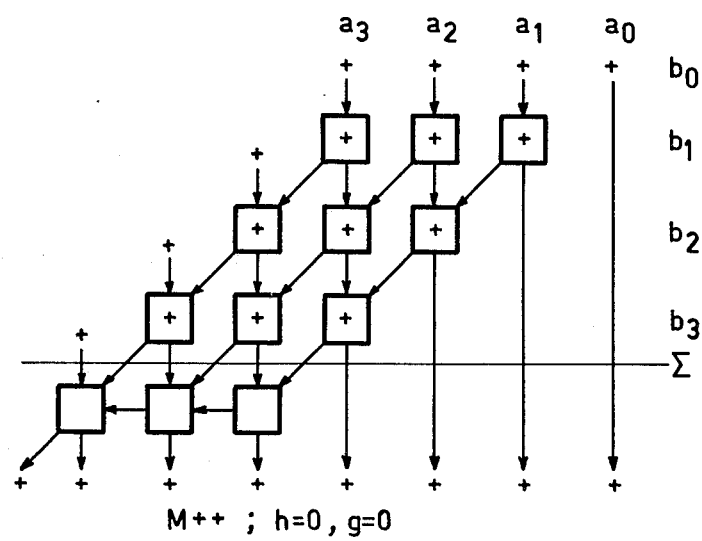
Figure 8C:
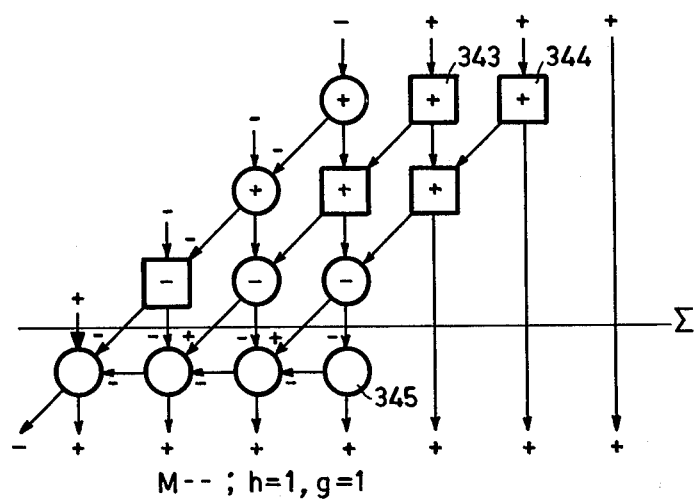
Figure 8D:
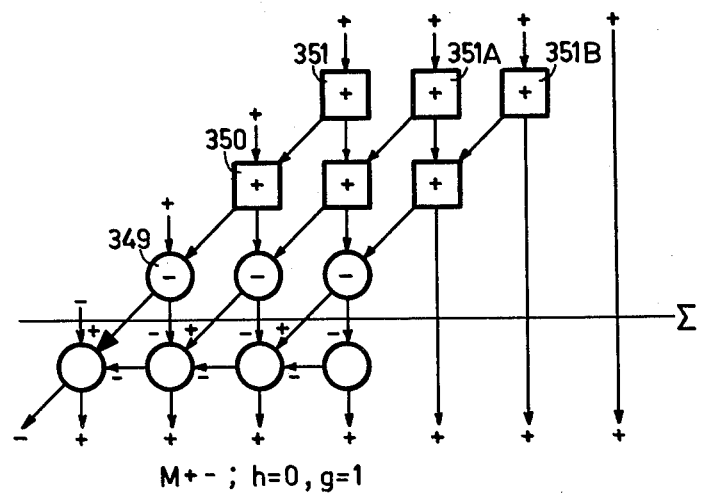
Figures 9, 10:
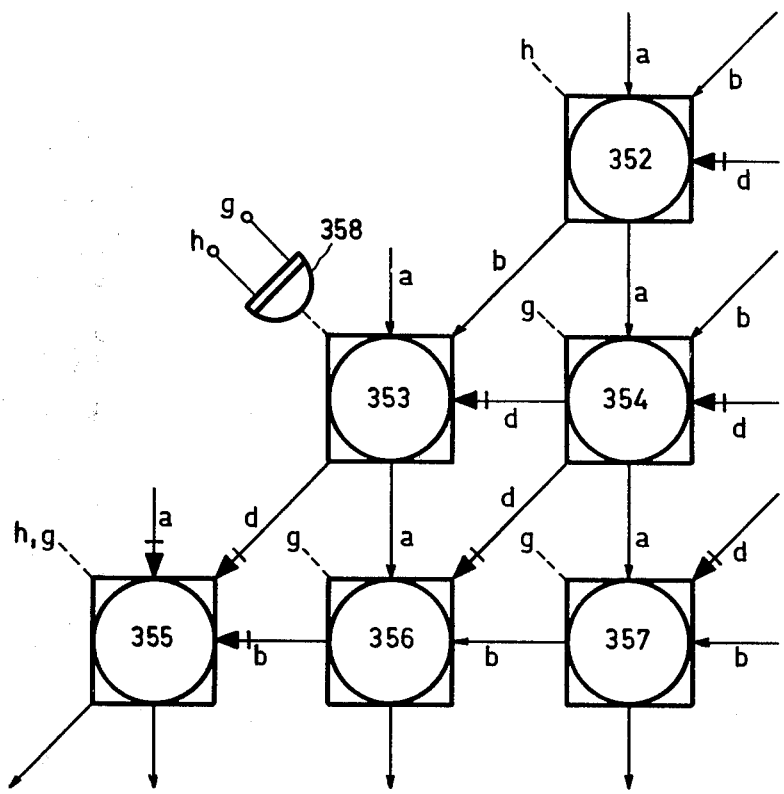
FIG. 9 shows a six-module detail of a multiplier.
FIG. 10 shows a function table for FIG. 9.

FIG. 9 shows a part of a multiplier according to FIG. 6 for performing all functions according to the FIGS. 8a-d. The part concerns the modules 22, 25, 24, 29, 28, 27 which correspond successively to the modules 352-357. The partial product forming means and the trigger circuits have been omitted for the sake of simplicity. The module 19 in FIG. 6 is controlled in the same way as in this case the module 352, the module 23 in the same way as in this case the modules 354, 356, 357 (this is also applicable to any programmable arithmetic module which is present instead of the switch 26 and which acts as a full adder/full subtractor): modules 17, 18, 20, 21 always perform the same function as a (full) adder, while the device can similarly be adapted to operands comprising more bits. As far as the external operation is concerned, the modules correspond to the circuit of FIGS. 2a, b, a realization of which in n-MOS dynamic logic is shown in the FIGS. 3, 4. For all modules, furthermore, the nature of the signals a, b, d is indicated and also, by means of an enlarged arrow, the origin of the signal d. The latter has a positive sign (full adder) or a negative sign (full subtractor) depending on the value of the control signal f. The module 355 is separately considered. Each module furthermore receives a control signal which is composed of the components h, g which are determined by the sign of the most-significant bit of the operand part to be processed. The interconnection of the modules is realized in known manner by way of conductor tracks provided on the integrated circuit. The module 352 is controlled by the signal h (f=h). The value of h equals 1 if the most-significant part of the first operand is concerned (FIGS. 8a, c). Otherwise, the value of h equals 0. The modules 354, 356, 357 are controlled by the signal g (f=g). The value of g equals 1 if the most-significant part of the second operand (FIGS. 8a, d) is concerned. Otherwise, the value of g equals 0. The module 353 is controlled in that in the EXCLUSIVE-OR-gate 358 addition of the signals g and h takes place (f=e⊕h). The value of g⊕h equals 0 if the most-significant part of both operands or a less-significant part of both operands is concerned. Otherwise, the value of g⊕h equals 1. If the control signal to the modules has the value 1 as described, they are controlled as a full subtractor; if the control signal has the value 0, they are controlled as a full adder.

With respect to the module 355, FIG. 10 shows a function table for each of the four cases of the FIGS. 8a-d. As discussed with reference to the FIGS. 2b, 4, for the surroundings the nature of the functions formed is the same for all subtract functions, only the position of the bit of deviating sign each time changing: in the situation of FIG. 8c, this is the bit a (most-significant partial product); in FIG. 8a, this is the bit b (positive carry signal from module 356), while in FIG. 8d the signal is a positive carry signal from the module 353, while the other two signals are negative. The control of the add/subtract function could be separated from the selector function for the signal of deviating sign. The sum bit (result bit) is each time formed in the same manner.

Figure 11:
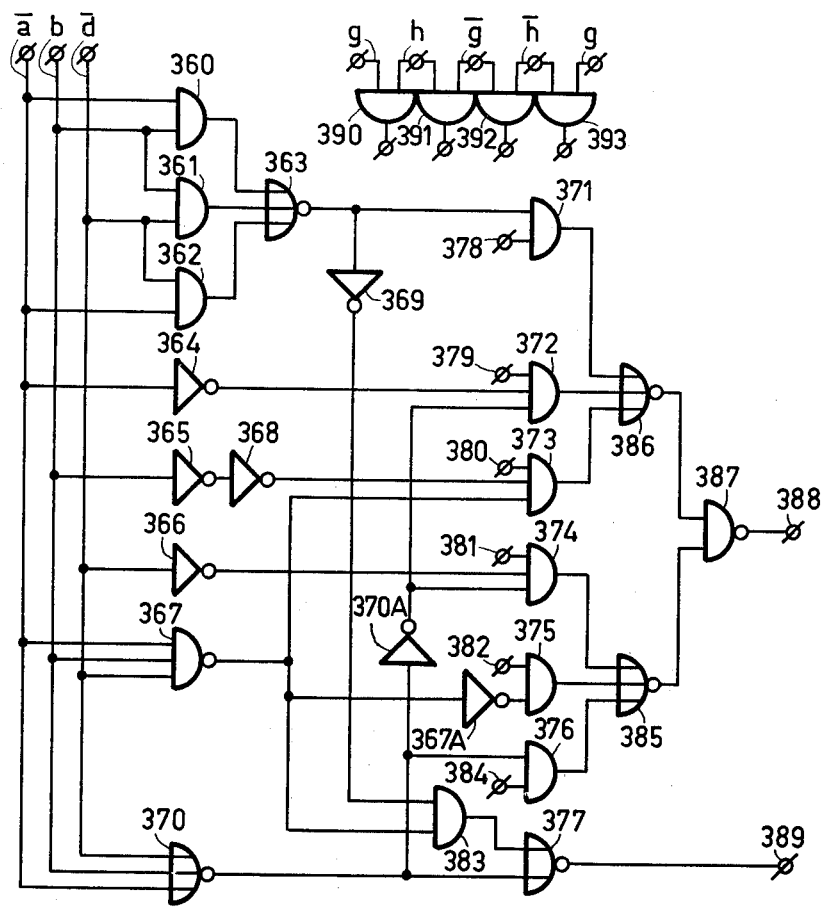
FIG. 11 shows one of the modules shown in FIG. 9.
Figure 12:
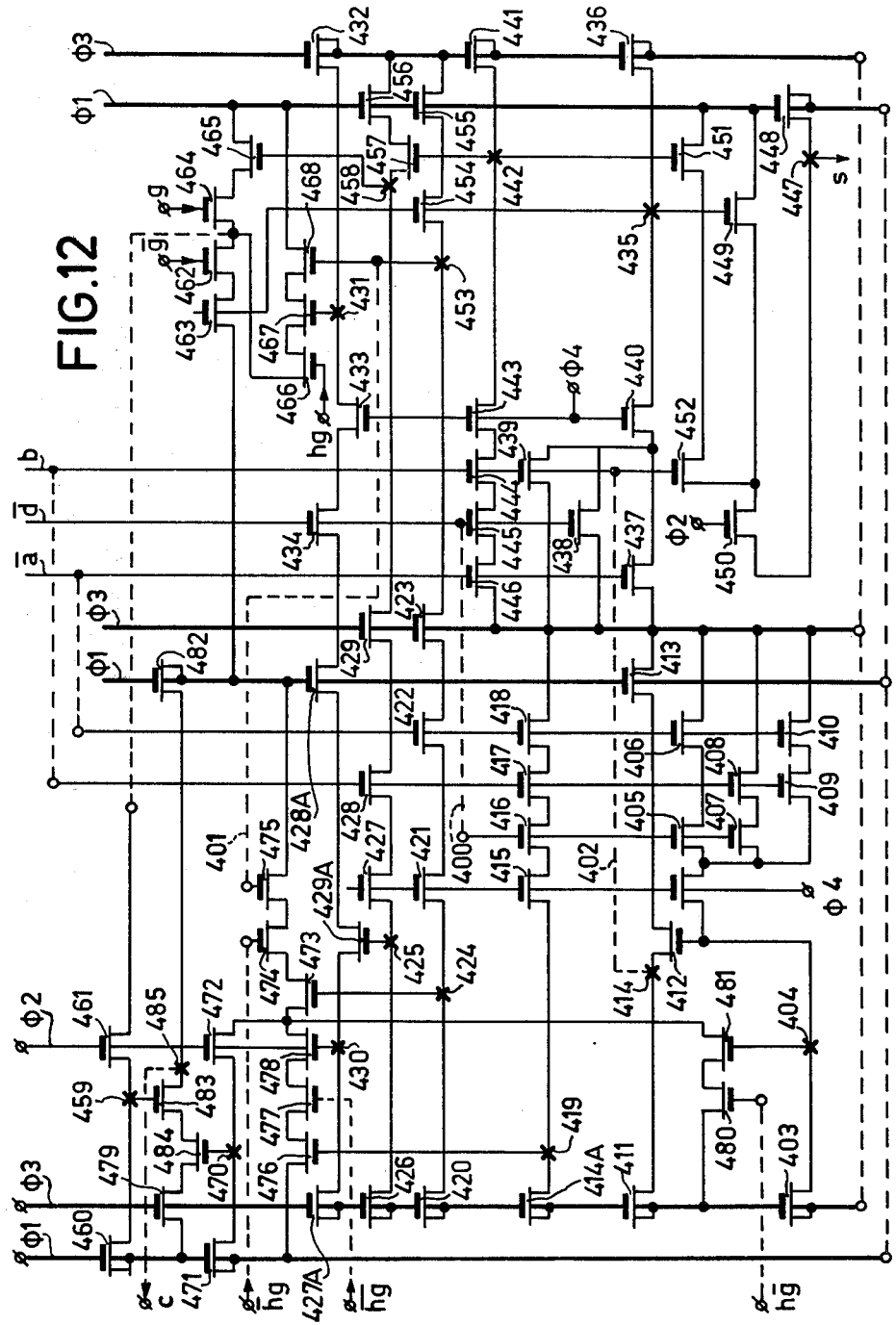
FIG. 12 shows the construction of one module of FIG. 11, in n-MOS transistors.

In this respect, FIG. 11 shows a construction of the module 355 using gates, while FIG. 12 shows a construction in four-phase dynamic MOS-logic. The circuit shown in FIG. 11, receives the signals a, b, d (a, d, thereof in inverted form) and the control signals g, h 390-393 first from all four combinations of the control signals: g.h, g.$\bar{\text{h}}$, $\bar{\text{g}}$.h, $\bar{\text{g}}.\bar{\text{h}}$. The gates 360-362, 363 correspond to the gates 106-108, 113 in FIG. 2a. The inverters 364-366 act as the inverter 118A in FIG. 2 for each input signal. The gates 367, 370, 383, 377 act as the gates 109, 115, 112, 114 in order to form the sum s on the terminal 389. It is to be noted that the sum bit of the data bits a, b, d always equals that of the data bits $\bar{\text{a}}$, b, $\bar{\text{d}}$, two of which are inverted. The supply in inverted form is advantageous in view of realization in the form of the circuit shown in FIG. 12. These signals are produced by "type 2" gates which are less susceptible to cross-talk on comparatively long lines than "type 1" gates. This property is well-known in the technology used.

The terminal 378 receives the signal $\bar{\text{g}}$.h, the terminal 380 receives the signal g.$\bar{\text{h}}$, the terminal 381 receives the signal g.h, the terminal 382 receives the signal g and the terminal 384 receives the signal $\bar{\text{g}}$. If the device must operate as an adder (g=h=0), the gates 373, 376 are active. The gate 373 forms the signal:

$$\overline{(\bar{\text{a}}.\text{b}.\bar{\text{d}})}.\text{b}=(\text{a}+\bar{\text{b}}+\text{d}).\text{b}=\text{ab}+\text{bd}$$

The gate 376 forms the signal $\overline{\bar{\text{a}}+\text{b}+\bar{\text{d}}}=\text{a}.\bar{\text{b}}.\text{d}$, and the gates 385, 386, 387 form the OR-function therefrom.

If g=h=1, the gates 374, 375 are active. The gate 374 forms d.$\overline{(\bar{\text{a}}+\text{b}+\bar{\text{d}})}$=d($\bar{\text{a}}$+b). The gate 375 forms $(\bar{\text{a}}.\text{b}.\bar{\text{d}})$. These are combined to form:

$$d.(\overline{a+b}) + (\overline{a.b.d}) = \overline{a}(d+b.\overline{d}) + b.d$$
$$= \overline{a}(d+b+a) + b.d.a$$

If $g=1$ and $h=0$, the gates 372, 375 are active. The gate 372 forms: $a.(\overline{a+b+d})$. The gate 375 forms $\overline{a}.b.\overline{d}$. These are combined to form $a(b+\overline{d})+\overline{a}.b.\overline{d}=\overline{d}(a+\overline{a}.b)+ab=\overline{d}(a+b+d)+abd$.

If $g=0$ and $h=1$, the gates 371, 376 are active. The gate 371 forms: $\overline{a.b+b.d+d.a}$. The gate 376 forms: $a.\overline{b}.d$. Together these form:

$$a.\overline{b}.d+a.d+\overline{b}.d+\overline{b}.a=\overline{b}(a+d+a.d)+a.d= \overline{b}(a+b+d)+a.b.d.$$

FIG. 12 shows, in the same way as already described, a construction in four-phase dynamic n-MOS logic of this function. The connectors for the clock pulses are denoted by $\phi1-\phi4$. The clock pulse lines $\phi1$, $\phi3$ and the connections for the data bits $\overline{a}$, b, $\overline{d}$ extend in a first direction, like the output for the sum bits. The connections for the control signals gh, g$\overline{h}$, $\overline{g}$h, $\overline{g}.\overline{h}$, like the clock pulse lines $\phi2$, $\phi4$, and the output for the carry signal, extend in a direction transversely thereof. They are indicated as said aluminium wiring layer. This is also applicable to the connections for intermediate signals 400, 401, 402 which are denoted by broken lines. The node 404 is precharged by the clock pulse $\phi3$ via the transistor 403, and is sampled by the clock pulse $\phi4$, the transistors 405–410 forming the AND-functions of the gates 360-362. The function of the gate 363 is thus performed on the node 404. The transistor 411 charges the node 414 which is sampled by a series connection of transistors 412 (driven by the signal on the node 404) and 413 (driven by $\phi1$). The inverter 369 is thus realized. The node 419 is precharged by the transistor 414A (clock pulse $\phi3$) and is sampled by a series connection of transistors 415–418 ($\phi4$ and the input data). The gate function 367 is thus formed on the node 419. The node 424 is precharged by the clock pulse $\phi3$ on the transistor 420 and is sampled by a series connection of transistor 421 ($\phi4$) and transistor 422 ($\overline{a}$). The inverter 364 is thus implemented on the node 424. The node 425 is precharged by the clock pulse $\phi3$ on the transistor 426 and is sampled by a series connection of transistor 427 ($\phi4$) and transistor 428 (signal b). The inverter 365 is thus implemented on the node 425. The node 430 is precharged by the transistor 427A ($\phi3$) and is sampled by a series connection of transistors 429A (driven by the node 425) and transistor 428A ($\phi1$). The inverter 368 is thus implemented on the node 430. The node 431 is precharged by transistor 432 (clock pulse $\phi3$) and is sampled by a series connection of transistors 433 (clock pulse $\phi4$) and 434 (driven by signal d). The inverter 366 is thus implemented on the node 431. The node 435 is precharged by transistor 436 (clock pulse $\phi3$) and sampled by transistor 440 (clock pulse $\phi4$) in series with a parallel connection of transistors 437, 438, 439, each of which is actuated by one of the input data. The NOR-function of the gate 370 is thus implemented on the node 435.

The node 442 is precharged via transistor 441 (driven by the clock pulse $\phi3$) and is sampled by a series connection of transistor 443 (driven by the clock pulse $\phi4$) and transistors 444, 445, 446, each of which is driven by one of the data signals. The NAND-gate 367 is thus implemented again on the node 442 (cf. the already described node 419). This data is thus available in locations which are geometrically situated far apart. Thus, a long connection which would be susceptible to interference is not required in this case. The node 447 is precharged by transistor 448 (driven by the clock pulse $\phi1$) and is sampled by a series connection of transistor 450 (clock pulse $\phi2$) and a parallel connection of two branches. The first branch comprises transistor 449 (driven by the signal from the node 435: NOR-gate 370). The second branch comprises a series connection of transistor 452 (driven by the signal from the node 414: inverter 369), and transistor 451 (driven by the signal from the node 442). The output signal s (gates 383, 377) is thus formed on the node 447.

The node 453 is precharged by transistor 423 (clock pulse $\phi3$) and is sampled by a series connection of transistors 455 (driven by the clock pulse $\phi1$) and transistor 454 (driven by the signal from the node 435). The inverter 370A of FIG. 11 is thus implemented on the node 453. Similarly, via transistors 429, 456, 457, the inverter 367A is implemented on the node 458. The node 459 is precharged via transistor 460 (driven by the clock pulse $\phi1$) and is sampled via transistor 461 (driven by the clock pulse $\phi2$) and three parallel-connected branches. The first branch comprises a series connection of transistors 462 (driven by the control signal $\overline{g}$) and 463 (driven by the node 435), the gate 376 thus being implemented. The second branch comprises a series connection of transistors 464 (driven by the control signal g) and 465 (driven by the node 458), the gate 375 thus being implemented. The third branch comprises a series connection of transistors 466 (driven by the control signal g.h), 467 (driven by the node 431) and 468 (driven by the node 453), the gate 374 thus being implemented. The gate 385 is thus implemented on the node 459.

The node 470 is precharged via transistor 471 (clock pulse $\phi1$) and is sampled via a series connection of transistor 472 (driven by the clock pulse $\phi2$) and three mutually parallel-connected branched. The first branch comprises a series connection of transistors 473 (driven by the node 424), 474 (driven by the control signal $\overline{h}.g$) and 475 (driven by the signal on the node 453), the gate 372 thus being implemented. The second branch comprises a series connection of transistors 476 (driven by the node 419), 477 (driven by the control signal $\overline{g}.\overline{h}$) and 478 (driven by the node 430-inverter 368), the gate 373 thus being implemented. The third branch comprises a series connection of transistors 480 (driven by the control signal $\overline{g}.h$) and 481 (driven by the node 404), the gate 371 thus being implemented. The NOR-gate 386 is thus implemented on the node 470. The node 485 is precharged by transistor 482 (driven by the clock pulse $\phi1$) and is sampled via a series connection of transistors 479 ($\phi3$), 483 (driven by the node 459) and 484 (driven by the node 470), so that ultimately the gate 387 is implemented to produce the signal c. This completes the description of FIG. 12.

A comparison of the circuits shown in the FIGS. 3, 4 and 12 shows that FIG. 3 offers a standard module, FIG. 4 a module having the same width (transversely of the clock pulse line $\phi1$, $\phi3$) and a larger height, while FIG. 12 shows a module having the same height as FIG. 4 and double the width. The choice of different geometrical layouts per se may be independent of the logic construction. The layout of the arithmetic modules not explicitly given down to the transistor level is realized in a similar manner.

Figure 14:
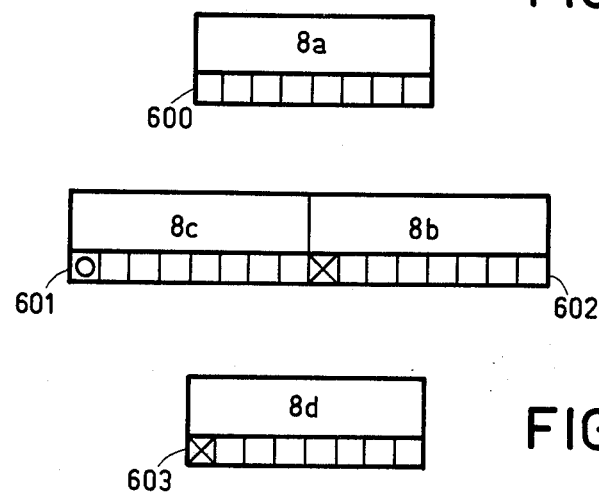
FIG. 14 shows a combination of sub-circuits as shown in FIGS. 8a to 8d.
Figure 13:
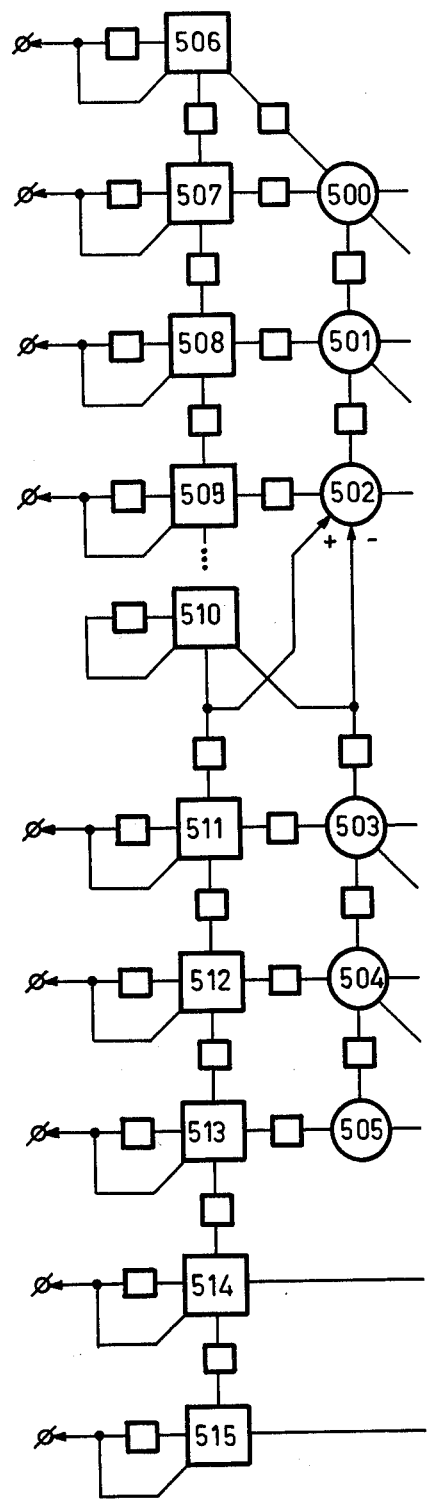
FIG. 13 shows the linking of two circuits as shown in FIGS. 8a to 8d.

FIG. 13 shows the linking of two circuits 8c, d, or also 8a, b if the latter includes a programmable full adder/subtractor instead of the switch 26. For the sake of simplicity, the bottom row shows only three full subtractors (500–502 or 503–505). Furthermore, for the more-significant device four modules (506–509) of the accumulator register are shown (the other two are omitted). All six modules of the accumulator register 510–515 of the less-significant device are shown. The modules 509/510 this have the same significance. In this case, the data in the module would have a negative sign. In order to realize exclusively positive signals, the carry signal from the module 503, having a negative sign, and the carry signal from the module 511, having a positive sign, are applied to the module 502 which is then controlled as a full subtractor with three input signals. For the multipliers shown in the FIGS. 8a, b, this can be realized in the same manner when a module which is driven as a full adder is present instead of the switch 26. Using the layout shown in FIG. 8 (4×4 bit operands), the relevant sub-devices produce the bit series 600–603 shown in FIG. 14. The bits denoted by a cross are void. The bit denoted by a circle has a negative sign. Addition to obtain the final result is performed in a known adder.

What is claimed is:

1. A device for multiplying a first and second binary number, said numbers having at the most q and p (p, q>2) bit positions, respectively, said device having first means for forming at the most p×q bit-wise partial products of said two numbers, second means having an array of (p−1)×q arithmetic modules, (p−1) of said modules having at least two inputs, the other arithmetic modules having three inputs, for forming an algebraic sum from each input of two and three binary values respectively, taking into account their sign, and for forming therefrom a two-bit number of result and carry; said modules being connected in accordance with corresponding bit-wise significance levels for receiving said partial products and corresponding bits of said results until for each significant level a single final result bit is generated on the outputs of (p+q−2) modules and also an additional bit of highest significance on a special output of the most-significant one of said (p+q−2) modules and a bit of lowest significance on the output of lowest significance of said first means, characterized in that for the multiplication of two numbers in two's-complement notation said second means has eight groups comprising:

a first group consisting of a single subtractor module (29) for receiving, as a full subtractor, the most significant partial product of positive sign and two further bits of intermediate result of negative sign;

a second group of one module (25) for receiving, as full adder, the two partial products of next-lower significance of negative sign and one bit of intermediate result of negative sign;

a third group of (q−3) modules (22) for receiving, as full subtractors, one partial product which originates from the most-significant bit position of the second number and the respective (q−3) most-significant but two bit positions of the first number of negative sign, a further partial product of positive sign which does not originate from the most-significant bit position of the first number, and one further bit of intermediate result of negative sign;

a fourth group of one module (19) for receiving, as at least a half-subtractor, a partial product originating from the most-significant bit position of the second number and from the least-significant bit position of the first number of negative sign, and one further partial product of positive sign which doe not originate from the most-significant bit position of the first number;

a fifth group of (p−2) modules (23, 24) for receiving, as a full subtractor, one partial product of negative sign which originates from the most-significant bit position of the second number and the relevant (p−2) less-significant bit positions of the first number, and furthermore two bits of intermediate result of positive sign;

a sixth group of (p−2) modules (17, 18) for receiving as at least a half-adder, two partial products of positive sign;

a seventh group of (p−2) (q−3) modules (20, 21) for receiving, as a full adder, a partial product of positive sign and two bits of intermediate result of positive sign; and an eighth group of (p−2) modules (27, 28) for receiving, as a full subtractor, a result bit of negative sign with a carry bit of positive sign, originating from said fifth group, and also the result bit of said second group of negative sign, and for serially presenting an output carry bit within the eighth group and subsequently to the first group, and (p−2) results bits parallel-wise to the outputs of the eighth group;

third means for supplying the least-significant module of the eighth group with the final result bit of next-lower significance level of negative sign;

the full subtractors of the first, third, fifth and eighth groups being constructed to form the said logic functions;

all (half) subtractors comprising, in order to form the product of two numbers having exclusively bits of positive sign, a control input in order to be controlled as a (half) adder by a signal present thereon, said third means having a control input in order to be deactivated by a signal then present thereon.

2. A device as claimed in claim 1, characterized in that the full adders of the second and seventh groups are constructed to form the same logic functions.

3. A device as claimed in claim 1, characterized in that the arithmetic modules which are a first group of said q (p−1) modules, which form an accumulator register by way of their full adder function, are constructed as an integrated circuit in dynamic MOS logic with an inherent latch (hold) function on the outputs for result bit and carry; and a second group of series-connected modules, having a logic construction which corresponds to that of the first group of said q (p−1) modules, said second group of series-connected modules having its inputs connected to the outputs for the final result bits.

4. A device for multiplying two binary numbers in two's-complement notation which include at the most p and at the most bq bit positions, respectively by means of b multipliers, each of which is a device for multiplying a first and second binary number, said numbers having at the most q and p (p, q>2) bit positions, respectively, said device having first means for forming at the most p×q bit-wise partial products of said two numbers, second means having an array of (p−1)×q arithmetic modules, (p−1) of said modules having at least two inputs, the other arithmetic modules having three inputs, for forming an algebraic sum from each input of two and three binary values respectively, taking into account their sign, and for forming therefrom a two-bit number of result and carry; said modules being connected in accordance with corresponding bit-wise significance levels for receiving said partial products and corresponding bits of said results until for each significance level a single final result bit is generated on the outputs of (p+q−2) modules and also an additional bit of highest significance on a special output of the most-significant one of said (p+q−2) modules and a bit of lowest significance on the output of lowest significance of said first means;

said second means having eight groups comprising:

a first group consisting of a single subtractor module (29) for receiving, as a full subtractor, the most significant partial product of positive sign and two further bits of intermediate result of negative sign;

a second group of one module (25) for receiving, as a full adder, the two partial products of next-lower significance of negative sign and one bit of intermediate result of negative sign;

a third group of (q−3) modules (22) for receiving, as full subtractors, one partial product which originates from the most-significant bit position of the second number and the respective (q−3) most-significant but two bit positions of the first number of negative sign, a further partial product of positive sign which does not originate from the most-significant bit position of the first number, and one further bit of intermediate result of negative sign;

a fourth group of one modules (19) for receiving, as at least a half-subtractor, a partial product originating from the most-significant bit position of the second number and from the least-significant bit position of the first number of negative sign, and one further partial product of positive sign which does not originate from the most-significant bit position of the first number;

a fifth group of (p−2) modules (23, 24) for receiving, as a full subtractor, one partial product of negative sign which originates from the most-significant bit position of the second number and the relevant (p−2) less-significant bit positions of the first number, and furthermore two bits of intermediate result of positive sign;

a sixth group of (p−2) modules (17, 18) for receiving as at least a half-adder, two partial products of positive sign;

a seventh group of (p−2)(q−3) modules (20, 21) for receiving, as a full adder, a partial product of positive sign and two bits of intermediate result of positive sign; and an eighth group of (p−2) modules (27, 28) for receiving, as a full subtractor, a result bit of negative sign with a carry bit of positive sign, originating from said fifth group, and also the result bit of said second group of negative sign, and for serially presenting an output carry bit within the eighth group and subsequently to the first group, and (p−2) result bits parallel-wise to the outputs of the eighth group;

third means for supplying the least-significant module of the eighth group with the final result bit of next-lower significance level of negative sign;

the full subtractors of the first, third, fifth and eighth groups being constructed to form the same logic functions;

all (half) subtractors comprising, in order to form the product of two numbers having exclusively bits of positive sign, a control input in order to be controlled as a (half) adder by a signal present thereon, said third means having a control input in order to be deactivated by a signal then present thereon;

where b>1, characterized in that:

said b multipliers form a second array of increasing significance in accordance with

| Ma,1 | Ma-1,1 | M2,1 | M1,1... |
|---|---|---|---|
| Ma,2 | Ma-1,2 | M2,2 | M1,2... |
| Ma,b-1 | Ma-1,b-1 | M2,b-1 | M1,b-1... |
| Ma,b | Ma-1,b | M2,b | M1,b... |
| ... | ... | ... | ... | where the multiplier M1,b has the highest significance;

control inputs for changing under the influence of a signal thereon, the operation of second, fifth and eighth groups of arithmetic modules of the multipliers M1,1...M1, b−1 with respect to the operation in the multiplier M1,b during execution of a multiplication of two numbers in two's-complement notation, that is to say to convert (full) adders into (full) subtractors, and vice versa;

and fourth means for forming a final product by algebraic addition of the final result bits of the multipliers, taking into account their significance level.

5. A device for multiplying two binary numbers in two-'s-complement notation which comprise at the most ap and at the most q bit positions, respectively, by means of a multipliers, each of which is a device for multiplying a first and second binary number, said numbers having at the most q and p (p, q>2) bit positions, respectively, said device having first means for forming at the most p×q bit-wise partial products of said two numbers, second means having an array of (p−1)×q arithmetic modules, (p−1) of said modules having at least two inputs, the other arithmetic modules having three inputs, for forming an algebraic sum from each input of two and three binary values respectively, taking into account their sign, and for forming therefrom a two-bit number of result and carry; said modules being connected in accordance with corresponding bit-wise significance levels for receiving said partial products and corresponding bits of said results until for each significance level a single final result bit is generated on the outputs of (p+q−2) modules and also an significance on a special output of the most-significant one of said (p+q−2) modules and a bit of lowest significance on the output of lowest significance of said first means, characterized in that for the multiplication of two numbers in two's-complement notation, said second means having eight groups comprising:

a first group consisting of a single subtractor module (29) for receiving, as a full subtractor, the most significant partial product of positive sign and two further bits of intermediate result of negative sign;

a second group of one module (25) for receiving, as a full adder, the two partial products of next-lower significance of negative sign and one bit of intermediate result of negative sign;

a third group of (q−3) modules (22) for receiving, as full subtractors, one partial product which originates from the most-significant bit position of the second number and the respective (q−3) most-significant but two bit positions of the first number of negative sign, a further partial product of positive sign which does not originate from the most-significant bit position of the first number, and one further bit of intermediate result of negative sign;

a fourth group of one module (19) for receiving, as at least a half-subtractor, a partial product originating from the most-significant bit position of the second number and from the least-significant bit position of the first number of negative sign, and one further partial product of positive sign which does not originate from the most-significant bit position of the first number;

a fifth group of (p−2) modules (23, 24) for receiving, as a full subtractor, one partial product of negative sign which originates from the most-significant bit position of the second number and the relevant (p−2) less-significant bit positions of the first number, and furthermore two bits of intermediate result of positive sign;

a sixth group of (p−2) modules (17, 18) for receiving as at least a half-adder, two partial products of positive sign;

a seventh group of (p−2) (q−3) modules (20, 21) for receiving, as a full adder, a partial product of positive sign and two bits of intermediate result of positive sign; and an eighth group of (p−2) modules (27, 28) for receiving, as a full subtractor, a result bit of negative sign with a carry bit of positive sign, originating from said fifth group, and also the result bit of said second group of negative sign, and for serially presenting an output carry bit within the eighth group and subsequently to the first group, and (p−2) result bits parallel-wise to the outputs of the eighth group;

third means for supplying the least-significant module of the eighth group with the final result bit of next-lower significance level of negative sign;

the full subtractors of the first, third, fifth and eighth groups being constructed to form the same logic functions;

all (half) subtractors comprising, in order to form the product of two numbers having exclusively bits of positive sign, a control input in order to be controlled as a (half) adder by a signal present thereon, said third means having a control input in order to be deactivated by a signal then present thereon;

where a>1, characterized in that:

said a multipliers form a second array of successive significance in accordance with Ma,1 Ma−1,1 . . . M2,1 M1,1 where the multiplier Ma,1 has the highest significance;

control inputs for changing, under the influence of a signal thereon, the operation of second, third and fourth groups of arithmetic modules of the multipliers Ma−1,1 . . . M1,1 with respect to the operation in multiplier Ma,1 during execution of a multiplication of two numbers in two's-complement notation, that is to say to convert (full) adders into (full) substractors and vice versa;

fourth means for forming a final product by algebraic addition of the final result bits of the multipliers, taking into account their significance level;

said third means of the multipliers Ma,1 . . . M2,1 forming a full subtractor additionally to said eighth group in order to receive the final result bit of negative sign of the relevant significance from this multiplier, and also from the multiplier of next lower significance the two bits which arrive as carry signals of the highest significance but one in said fourth means, thus receiving one bit of negative sign (503) and one bit of positive sign (511), with inhibition of direct further processing of said carry signals in said fourth means.

6. A device for multiplying two binary numbers in two's-complement notation which comprise at the most ap and bp bit positions, respectively, by means of (a×b) multipliers, each of which is a device for multiplying a first and second binary number, said numbers having at the most q and p (p, q>2) bit positions, respectively, said device having first means for forming at the most p×q bit-wise partial products of said two numbers, second means having an array of (p−1)×q arithmetic modules, (p−1) of said modules having at least two inputs, the other arithmetic modules having three inputs, for forming an algebraic sum from each input of two and three binary values respectively, taking into account their sign, and for forming therefrom a two-bit number of result and carry; said modules being connected in accordance with corresponding bit-wise significance levels for receiving said partial products and corresponding bits of said results until for each significance level a single final result bit is generated on the outputs of (p+q−2) modules and also an additional bit of highest significance on a special output of the most-significant one of said (p+q−2) modules and a bit of lowest significance on the output of lowest significance of said first means, characterized in that for the multiplication of two numbers in two's-complement notation, said second means having eight groups comprising:

a first group consisting of a single subtractor module (29) for receiving, as a full subtractor, the most significant partial product of positive sign and two further bits of intermediate result of negative sign;

a second group of one module (25) for receiving, as a full adder, the two partial products of next-lower significance of negative sign and one bit of intermediate result of negative sign;

a third group of (q−3) modules (22) for receiving, as full subtractors, one partial product which originates from the most-significant bit position of the second number and the respective (q−3) most-significant but two bit positions of the first number of negative sign, a further partial product of positive sign which does not originate from the most-significant bit position of the first number, and one further bit of intermediate result of negative sign;

a fourth group of one module (19) for receiving, as at least a half-subtractor, a partial product originating from the most-significant bit position of the second number and from the least-significant bit position of the first number of negative sign, and one further partial product of positive sign which does not originate from the most-significant bit position of the first number;

a fifth group of (p−2) modules (23, 24) for receiving, as a full subtractor, one partial product of negative sign which originates from the most-significant bit position of the second number and the relevant (p−2) less-significant bit positions of the first number, and furthermore two bits of intermediate result of positive sign;

a sixth group of (p−2) modules (17, 18) for receiving as at least a half-adder, two partial products of positive sign;

a seventh group of (p−2) (q−3) modules (20, 21) for receiving, as a full adder, a partial product of positive sign and two bits of intermediate result of positive sign; and an eighth group of (p−2) modules (27, 28) for receiving, as a full subtractor, a result bit of negative sign with a carry bit of positive sign, originating from said fifth group, and also the result bit of said second group of negative sign, and for serially presenting an output carry bit within the eighth group and subsequently to the first group, and (p−2) result bits parallel-wise to the outputs of the eighth group;

third means for supplying the least-significant module of the eighth group with the final result bit of next lower significance level of negative sign;

the full subtractors of the first, third, fifth and eighth groups being constructed to form the same logic functions;

all (half) subtractors comprising, in order to form the product of two numbers having exclusively bits of positive sign, a control input in order to be controlled as a (half) adder by a signal present thereon, said third means having a control input in order to be deactivated by a signal then present thereon;

where (a+b)>3, characterized in that said (a×b) multipliers form a second array of successive significance in accordance with $M1,1$
$M1,2$
.
.
.
$M1,b$ where the multiplier $Ma,b$ has the highest significance and $M1,1$ has the lowest significance, the significances of $Mi,j$ and $Mk,l$ being the same if $i+j=k+l$;

control inputs for changing, under the influence of a signal thereon, the operation of said second, fifth and eighth groups of arithmetic modules of multipliers $Ma,1 \ldots Ma,b-1$ with respect to the operation in multiplier $Ma,b$ during execution of a multiplication of two numbers in two's-complement notation, to convert (full) adders into (full) subtractors and vice versa, and for changing the operation of said second, third and fourth groups of arithmetic modules of the multipliers $Ma-1,b \ldots M1,b$ with respect to the operation in module $Ma,b$ in order to control all arithmetic modules of the remaining multipliers except for the multiplier $Ma,b$, as (full) adders;

fourth means for forming a final product by algebraic addition of the final result bits of the multipliers, taking into account their significance level, said third means of the multipliers (except for $M1,b \ldots M1,1$) comprising a full subtractor (502) additional to said eighth group in order to receive the final result bit of negative sign of the relevant significance from this multiplier, and also from a multiplier of next-lower significance but one in said fourth means, one bit of negative sign (503) and one bit of positive sign (511), with inhibition of direct further processing of said carry signals in said fourth means.

* * * * *